United States Patent [19]

Hashimoto et al.

[11] 4,184,753

[45] Jan. 22, 1980

[54] AUTOMATIC FOCUS ADJUSTMENT CIRCUITRY FOR MOTION PICTURE CAMERAS

[75] Inventors: Nobuo Hashimoto, Ashiya; Hiroshi Hirata, Sakai, both of Japan

[73] Assignee: Minolta Camera Kabushiki Kaisha, Osaka, Japan

[21] Appl. No.: 965,410

[22] Filed: Dec. 1, 1978

[30] Foreign Application Priority Data

Dec. 22, 1977 [JP] Japan .................................. 52-153638

[51] Int. Cl.$^2$ .............................................. G03B 3/00
[52] U.S. Cl. ..................................... 352/140; 354/25; 354/195
[58] Field of Search ................... 352/140; 354/25, 195

[56] References Cited

U.S. PATENT DOCUMENTS 4,157,217  6/1979  Isono .................................. 352/140

Primary Examiner—Russell E. Adams
Attorney, Agent, or Firm—Watson, Cole, Grindle & Watson

[57] ABSTRACT

In a motion picture camera, the response of a device for automatic focus adjustment is retarded, so that the change in the focus condition of the camera and the resultant change in angle of view and magnification of the image do not take place so rapidly during the photographing. An integrating circuit is provided to retard a signal indicative of out-of-focus condition, or a pulse generator is provided to intermittently power a drive motor for focus adjustment. The integrating circuit and the pulse generator are actuated concurrently with commencement of photographing.

6 Claims, 9 Drawing Figures

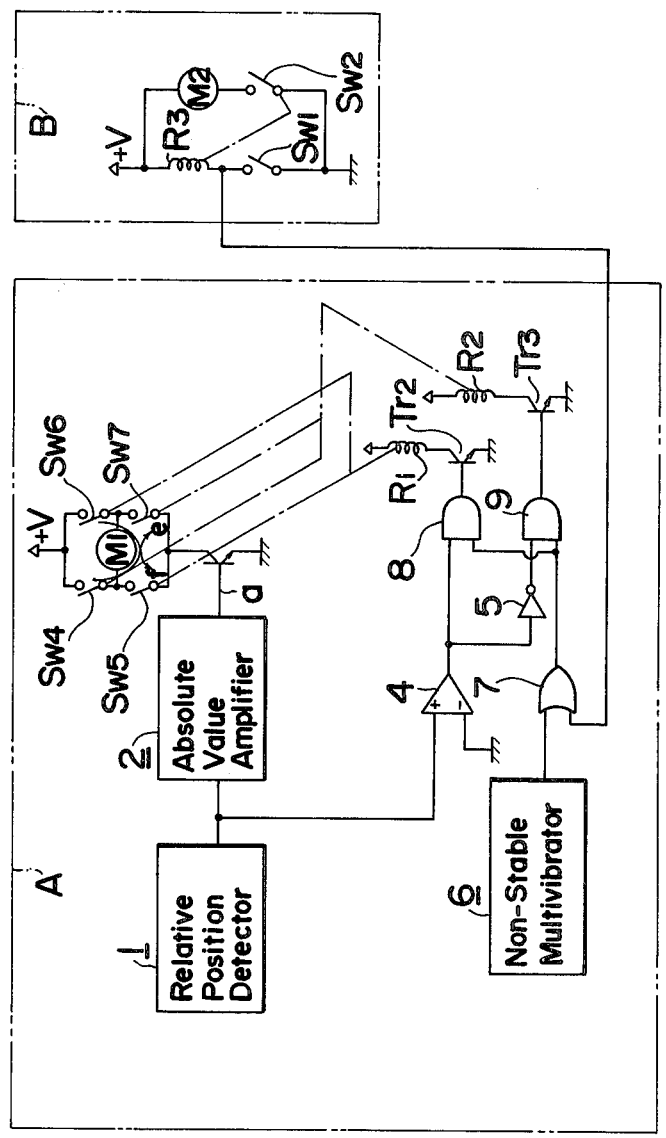

AUTOMATIC FOCUS ADJUSTMENT CIRCUITRY FOR MOTION PICTURE CAMERAS

BACKGROUND OF THE INVENTION

1. Field of the Invention

This invention relates to a motion picture camera equipped with an objective lens drive device for automatic focus adjustment.

2. Prior Art

The conventional objective lens drive device for automatic focus adjustment has the following disadvantage. Prior to filming, it is desirable to expedite the start of filming by ensuring a rapid alignment of the focus of the camera lens on the object to be filmed. But if the focus adjustment response is just as rapid during the driving of the camera after the start of filming, the focused position of the scene, i.e., the focus condition of the camera, often drifts during the course of filming. As such drifting occurs in the focused position, the angle of view and the magnification are frequently varied. When the film thus exposed is projected, the projected image is unsuitable for viewing.

SUMMARY OF THE INVENTION

The object of this invention is to overcome the above disadvantages and to thereby provide an objective lens drive device for a motion picture camera of the automatic focus adjusting type, wherein the response relative to a variation in camera-to-object distance is retarded from the response prior to driving of the motion picture camera so as to preclude an undesirable drift of the focused position of the scene and the consequent variation in the angle of view and magnification.

In accordance with the invention, the above objects and the advantages of the invention disclosed herein are obtained by circuitry for slowing the response of an automatic focus adjusting device during photographing such that change in the focused position in the scene and the resultant change in the angle of view and in the magnification are slowly effected. The inherent response of the automatic focus adjusting device may be retarded during photographing.

The automatic focus adjustment device may include relative position detecting circuitry for generating a signal indicative of the out-of-focus condition of the camera and the focus adjustment is accomplished in accordance with the aforementioned signal. The response retarding circuitry may include an integrating circuit which integrates the aforementioned signal to retard it and the integrating circuit is actuated concurrently with commencement of photography. In another alternative embodiment of the invention, in which the focus adjusting means includes a drive motor driven for focus adjustment, the response retarding means may include a circuit for intermittently interrupting the power supply to the drive motor.

BRIEF DESCRIPTION OF THE DRAWINGS

FIGS. 1(A) and 1(B) show the conventional mode of control for a motion picture camera of the automatic focus adjusting type, wherein FIG. 1(A) is a diagram showing a change with time of the camera-to-object distance and FIG. 1(B) is a diagram showing a change with time of the distance from the camera to the focused position;

FIGS. 2 and 4 are circuit diagrams representing respective first and second embodiments of this invention; and FIGS. 3(A)–3(E) show the control mode according to this invention, in which FIG. 3(A) is a diagram showing the output voltage of a relative position-detecting circuit, FIG. 3(B) is a diagram showing changes with time in camera-to-object distance and in the distance from the camera to the focused position, FIG. 3(C) is a diagram showing the change with time of the output voltage of an absolute-value amplifying circuit, FIG. 3(D) is a diagram showing the change with time of the current (I) flowing through motor $M_1$ during filming in the first embodiment of FIG. 2 and FIG. 3(E) is a diagram showing the change with time of the current (I) flowing through motor $M_1$ during filming in the embodiment of FIG. 4.

DESCRIPTION OF PREFERRED EMBODIMENTS

Figure 1A:
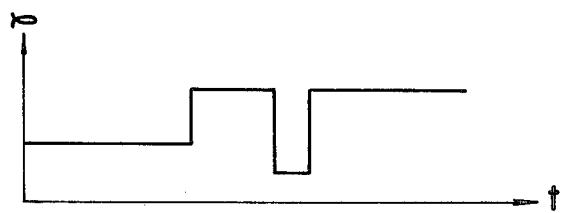
Figure 1B:
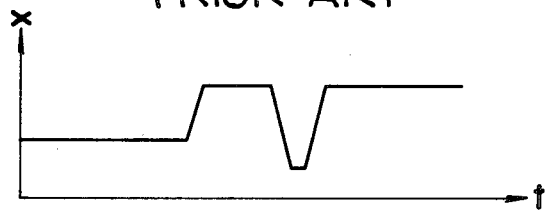

FIG. 1(A) shows a typical mode in which the position of the object to be filmed changes with time. If an automatic focus adjusting system has a sufficient speed of response for focus adjustment, the focused position of the scene changes accurately but with a slight delay as depicted in FIG. 1(B). This is a desirable characteristics when the camera is focused on a main object prior to filming and, before the start of filming, this delay is preferably as small as possible.

In the course of filming, however, it is not necessarily so. Thus, let it be assumed for instance, that a person or a vehicle crosses the scene in front of the main object. Then, the projected image obtained from the exposed film is not suitable for observation if the response for focus adjustment is too quick.

It is, therefore, contemplated in this invention to selectively delay the speed of response of the automatic focus adjusting system.

Figure 2:
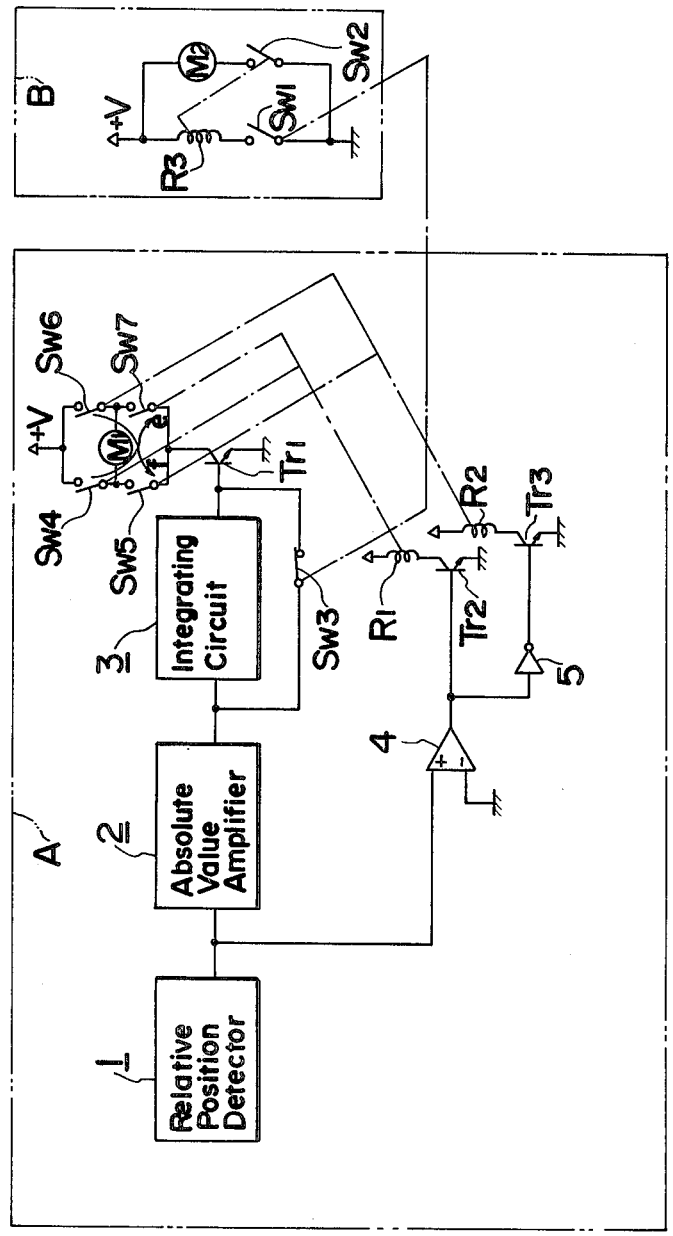
Figure 3A:
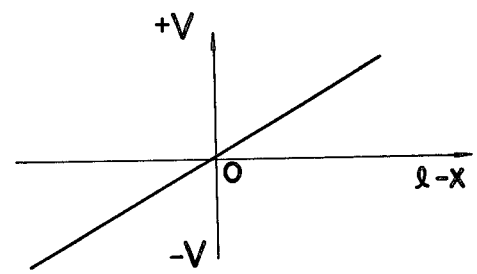
Figure 3B:
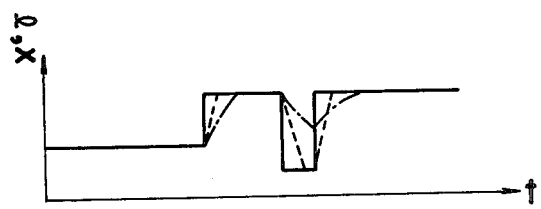
Figure 3C:
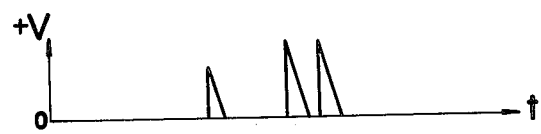

FIG. 2 shows an embodiment of this invention which has a construction for implementing the above object. Referring to FIG. 2, block A represents an automatic focus adjusting circuit, and block B represents a camera driving circuit. Position detector circuit 1, assuming that the camera-to-object distance is l and the distance from the camera to the focused position at that time is x, generates a voltage proportional to (l−x) as depicted in FIG. 3(A). Absolute value amplifying circuit 2 is capable of absolute-value amplification of the voltage from relative position detector circuit 1 and, when the camara-to-object distance has changed as represented by the solid line in FIG. 3(B), generates the voltage depicted in FIG. 3(C). Delay circuit 3, such as an integrating circuit, is connected in parallel with switch SW3 which is opened in synchronism with the closure of release switch SW1 and, upon opening of switch SW3, is inserted into the circuit to generate a voltage with a delayed response with respect to the output voltage of absolute value amplifying circuit 2.

Tr1 represents a transistor which is controlled in accordance with the voltage from absolute value amplifying circuit 2 while switch SW3 remains closed, and in accordance with the voltage from delay circuit 3 while SW3 is open. In either case, a current corresponding to the magnitude of the input voltage is allowed to flow through the collector and emitter of transistor Tr1.

Comparator 4 determines if the voltage of relative position detector circuit 1 is positive or negative. Comparator 4 produces a high-level output when the voltage of relative position detector circuit 1 is positive, and a low-level output when that voltage is negative. The output terminal of comparator 4 is directly coupled with the base of transistor Tr2 and, through an inverter 5, with the base of transistor Tr3.

Furthermore, relay coils R1 and R2 are connected in series with the collectors of transistors Tr2 and Tr3, respectively. In the above arrangement, when the output of comparator 4 is a high level, transistor Tr2 is ON and relay coil R1 is excited. Transistor Tr3 is ON and relay coil R2 is excited when the comparator output is a low level. A driving circuit for motor M1, which is adapted to drive the lens barrel for focus adjustment, includes transistor Tr1, switches SW4 and SW7, which are controlled by relay coil R1, and switches SW5 and SW6, which are controlled by relay coil R2. Thus, if relay coil R1 is excited, that is to say if the voltage output of relative position detector circuit 1 is positive and the focusing member of the objective lens barrel has to be driven toward an increased distance, switches SW4 and SW7 are closed so that the current flows in the direction indicated by the arrow e, and motor M1 rotates in the positive direction. However, if the voltage output of relative position detector circuit 1 is negative and the focusing member of the lens barrel has to be driven toward a decreased distance, switches SW5 and SW6 are closed, whereupon the current flows in the direction indicated by the arrow f, and motor M1 rotates in the reverse direction.

Camera drive circuit B includes relay coil R3 which is connected in series with release switch SW1 and switch SW2 which is controlled by relay coil R3. Camera drive motor M2 is connected in series with switch SW2. +V is a positive power source.

In the above arrangement, prior to filming, switch SW3 in automatic focus adjusting circuit A remains closed and, therefore, transistor Tr1 is controlled in accordance with the voltage from absolute value amplifying circuit 2. As a consequence, the focusing member of the objective lens barrel is driven either toward a farther distance or toward a nearer distance with a slight delay due to the inherent inertia of relative position circuit 1 and absolute value amplifier 2, as well as motor M1 and any other mechanism not shown, with the result that the distance from the camera to the focused position is altered at a relatively high speed as indicated by the broken line in FIG. 3(B). Here, of course, the judgment as to whether the focusing member of the objective lens barrel should be driven toward a farther distance or toward a nearer distance is effected according to the output of comparator 4. Thus, when the focusing member should be driven toward a farther distance, motor M1 is driven in the positive direction, whereas motor M1 is driven in the reverse direction when the focusing member is to be driven toward a nearer distance.

Figure 3D:

However, as switch SW1 is closed by the camera release action, relay coil R3 is excited, switch SW2 is closed accordingly and motor M2 starts rotating for filming. Because, as mentioned above, switch SW3 opens at the same time, delay circuit 3 is interposed between transistor Tr1 and absolute value amplifying circuit 2. As a consequence, a current with a delayed response is applied to motor M1 as depicted in FIG. 3(D) so that the driving speed of the focusing member of the objective lens barrel is reduced and the distance from the camera to the focused position changes slowly as indicated by the dot-dash line in FIG. 3(B).

By virtue of the above arrangement and features, any abrupt change in the focused position and the consequent variation of the angle of view and magnification during filming is prevented and, accordingly, the aforementioned deterioration in the quality of the projected image successfully avoided.

In accordance with the above-described embodiment a delay in response is imparted to the voltage for driving motor M1 only during filming.

In a second embodiment, shown in FIG. 4, the rotational speed of motor M1 is reduced by an intermittent interruption of the voltage for driving motor M1 only during filming. Thus, in this second embodiment, delay circuit 3 and switch SW3 are omitted but, in lieu thereof, non-stable multivibrator 8 which is a pulse generator, OR circuit 7 and AND circuits 8, 9 are added to the components of the first embodiment. Thus, two input terminals of OR circuit 7 are respectively connected to the output terminal of non-stable multivibrator 6 and to the node between relay coil R3 and release switch SW1 within camera drive circuit B so that, while switch SW1 is open, a high-level output is generated irrespective of the output of non-stable multivibrator 6 and, when switch SW1 is closed, a pulse output synchronized with the output of non-stable multivibrator 6 is generated. AND circuits 8 and 9 are operable only when the output of comparator 4 is a high level and a low level, respectively, so that while the output of OR circuit 7 is constantly high, the corresponding transistor Tr2 or Tr3 is constantly ON. When the output of OR circuit 7 is pulsed intermittently ON and OFF, the corresponding transistor Tr2 and Tr3 is intermittently ON.

Thus, in the arrangement of the above second embodiment, prior to filming, switch SW1 is open and, therefore, OR circuit 7 constantly generates a high-level output. Therefore, when the focusing member of the objective lens barrel should be driven toward a farther distance, the output of comparator 4 is a high level, transistor Tr2 is constantaly ON, the current corresponding to the voltage of absolute value amplifying circuit 2 flows in the direction of arrow e, and motor M1 rotates in the positive direction at a speed corresponding to the difference between the camera-to-object distance and the distance from the camera to the focused position. When the focusing member of the objective lens barrel should be driven toward a nearer distance, the output of OR gate 7 is a low level, transistor Tr3 is constantly ON, a current corresponding to the voltage of absolute value amplifying circuit 2 flows in the direction of arrow f, and motor M1 rotates in the reverse direction at a speed corresponding to the difference between the camera-to-object distance and the distance from the camera to the focused position.

Figure 3E:
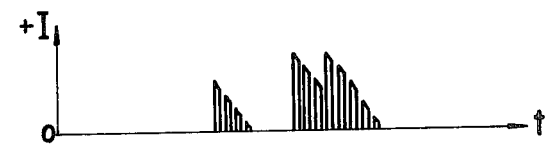

Now, as switch SW1 is closed by the camera release action, OR circuit 7 generates a pulse output. As a consequence, when the focusing member of the objective lens barrel should be driven toward a farther distance, transistor Tr2 is intermittently ON. When the focusing member should be driven toward a nearer distance, transistor Tr3 is intermittently ON. In accordance with which of the above situations obtains, the set of switches SW4 and SW7 or the set of switches SW5 and SW6 are intermittently closed, with the result that the current is also intermittently interrupted as depicted in FIG. 3(E). Accordingly, the speed of motor M1 is reduced as compared with the rotational speed prior to the start of filming and, hence, the speed of the focusing member of the objective lens barrel is also slowed down. Consequently, the distance from the camera to the focused position varies slowly as indicated by the dot-dash line in FIG. 3(B). Thus, by the arrangement of this second embodiment, the abrupt drift of focused position and the consequent change in the angle of view and the magnification are also successfully avoided.

What is claimed is:

1. A motion picture camera having an adjustable focus, comprising:
   means for driving said camera for photographing;
   an automatic focus adjusting device for detecting the focus condition of said camera on a target object and for automatically adjusting the focus condition of said camera in accordance with the detected focus condition; and
   means for slowing the response of said automatic focus adjusting device during photographing than before photographing.

2. A motion picture camera as in claim 1, wherein said automatic focus adjusting device has an inherent response, and said means for slowing includes means for retarding the inherent response of said automatic focus adjusting device during photographing.

3. A motion picture camera as in claim 2, further comprising manually operable means for concurrently actuating said camera driving means and said response retarding means.

4. A motion picture camera as in claim 3, wherein said automatic focus adjusting device includes relative position detecting means for generating a signal indicative of the out-of-focus condition of said camera, and focus adjusting means for effecting the focus adjustment in accordance with said signal.

5. A motion picture camera as in claim 4, wherein said response retarding means includes an integrating circuit for integrating said signal for retardation thereof, said integrating circuit being actuated concurrently with commencement of the photographing.

6. A motion picture camera as in claim 4, wherein said focus adjusting means includes a drive motor driven for focus adjustment, and wherein said response retarding means includes a circuit for intermittently interrupting the power supply to said drive motor, said circuit being actuated concurrently with commencement of photographing.

* * * * *